United States Patent [19]

Brown et al.

[11] Patent Number: 5,441,418
[45] Date of Patent: Aug. 15, 1995

[54] THERMOCHROMIC DRAWING DEVICE

[75] Inventors: William E. Brown, Blue Springs, Mo.; Charles W. Dietterich, Brodheadsville, Pa.; Richard M. Mandle, Woodcliff Lake, N.J.

[73] Assignee: Binney & Smith Inc., Easton, Pa.

[21] Appl. No.: 65,549

[22] Filed: May 20, 1993

[51] Int. Cl.$^6$ ............................................. G09B 11/00
[52] U.S. Cl. ...................................... 434/85; 434/408
[58] Field of Search .................... 434/408, 415, 85, 81

[56] References Cited

U.S. PATENT DOCUMENTS

| | | | |
|---|---|---|---|
| 1,592,148 | 7/1926 | Munn. | |
| 1,656,690 | 1/1928 | Blackburn. | |
| 3,167,444 | 1/1965 | Baumann et al.. | |
| 3,167,445 | 1/1965 | Baumann et al.. | |
| 3,561,269 | 2/1971 | Seitz | 73/356 |
| 3,802,945 | 4/1974 | James | 161/5 |
| 3,969,606 | 7/1976 | Veach | 219/237 |
| 4,028,118 | 6/1977 | Nakasuji et al. | 106/21 |
| 4,142,782 | 3/1979 | O'Brian | 350/354 |
| 4,151,748 | 5/1979 | Baum | 73/356 |
| 4,176,273 | 11/1979 | Fujie et al. | 219/220 |
| 4,425,161 | 1/1984 | Shibahashi et al. | 106/21 |
| 4,445,787 | 5/1984 | Parker | 374/141 |
| 4,554,565 | 11/1985 | Kito et al. | 346/201 |
| 4,590,381 | 5/1986 | Mendelson | 434/408 X |
| 4,703,335 | 10/1987 | Matsushita et al. | 503/204 |
| 4,717,710 | 1/1988 | Shimizu et al. | 503/213 |
| 4,720,301 | 1/1988 | Kito et al. | 106/21 |

(List continued on next page.)

FOREIGN PATENT DOCUMENTS

| | | |
|---|---|---|
| 2063973 | 3/1992 | Canada. |
| 0506452A1 | 3/1992 | European Pat. Off.. |
| 3-091133 | 3/1991 | Japan. |
| 3-092933 | 3/1991 | Japan. |
| 3-092934 | 3/1991 | Japan. |
| 3-128439 | 4/1991 | Japan. |
| 3-233917 | 8/1991 | Japan. |
| 3-270370 | 9/1991 | Japan. |
| 3-305410 | 10/1991 | Japan. |
| 4-329993 | 11/1992 | Japan. |
| 5-50754 | 3/1993 | Japan. |
| 5-77551 | 3/1993 | Japan. |

OTHER PUBLICATIONS

English Translation of Japanese Kokai Patent, HEI 5-50754, Mar. 2, 1993.
English Translation of Japanese Kokai Patent, HEI 5-77551, Mar. 30, 1993.
"Chromicolor", Product Catalogue for Matsui Shikiso Chemical Co., Ltd., 16 pages.
Instructions for Nickelodeon Color Writer TM Drawing Screen, copyright 1992, two pages.
English Translation of Japanese Application 3-233917, Aug. 21, 1991.
Englishi Translation of Japanese Application 3-270370, Sep. 20, 1991.
English Translations of Japanese Application 3-305410, Oct. 23, 1991.
English Translation of Japanese Application 3-091133, Mar. 28, 1991.

(List continued on next page.)

*Primary Examiner*—Gene Borcene
*Assistant Examiner*—Jeffrey A. Smith
*Attorney, Agent, or Firm*—Leydig, Voit & Mayer, Ltd.

[57] ABSTRACT

A thermochromic drawing device is disclosed which can be marked and erased by selectively changing the temperature of its drawing surface. The drawing surface of the drawing device consists of a flexible substrate printed with thermochromic inks having at least two color states. The flexible substrate has low thermal mass thereby enabling it to readily assimilate temperatures induced by a user and, consequently, facilitating the transition of the thermochromic inks from one color state to another. The drawing surface is further provided with an insulating layer which isolates the flexible substrate from unwanted heat sinks and heat sources thereby preventing unwanted color transitions of the thermochromic inks. Thus, a user can selectively change the color state of portions of the drawing surface to create distinctive markings.

29 Claims, 3 Drawing Sheets

U.S. PATENT DOCUMENTS

| | | | |
|---|---|---|---|
| 4,725,462 | 2/1988 | Kimura | 428/29 |
| 4,732,810 | 3/1988 | Kito et al. | 428/402 |
| 4,818,215 | 4/1989 | Taga | 431/126 |
| 4,820,683 | 4/1989 | Vervacke et al. | 503/210 |
| 4,826,550 | 5/1989 | Shimizu et al. | 156/166 |
| 4,834,500 | 5/1989 | Hilsum et al. | 350/331 |
| 4,853,361 | 8/1989 | Satake et al. | 503/201 |
| 4,853,362 | 8/1989 | Satake et al. | 503/209 |
| 4,855,277 | 8/1989 | Walter | 503/204 |
| 4,855,279 | 8/1989 | Ikeda et al. | 503/209 |
| 4,888,219 | 12/1989 | Barnes | 428/1 |
| 4,895,827 | 1/1990 | Vervacke et al. | 503/210 |
| 4,917,643 | 4/1990 | Hippely et al. | 446/14 |
| 4,917,948 | 4/1990 | Hotta | 428/335 |
| 4,920,991 | 5/1990 | Shibahashi et al. | 132/73 |
| 4,977,030 | 12/1990 | Hotta et al. | 428/447 |
| 5,011,445 | 4/1991 | Nakasuji et al. | 446/14 |
| 5,049,428 | 9/1991 | Kanno et al. | 428/64 |
| 5,073,696 | 12/1991 | Patillo et al. | 219/233 |
| 5,079,049 | 1/1992 | Kito et al. | 428/24 |
| 5,085,607 | 2/1992 | Shibahashi et al. | 446/14 |
| 5,087,601 | 4/1992 | Hotta et al. | 503/200 |
| 5,152,611 | 10/1992 | Pieper et al. | 374/160 |
| 5,158,924 | 10/1992 | Konagaya et al. | 503/201 |
| 5,158,926 | 10/1992 | Hotta et al. | 503/217 |
| 5,203,702 | 4/1993 | Wilson | 434/408 X |
| 5,219,625 | 6/1993 | Matsunami et al. | 428/30 |
| 5,219,820 | 6/1993 | Morohoshi et al. | 503/204 |
| 5,254,382 | 10/1993 | Ueno et al. | 428/64 |
| 5,258,350 | 11/1993 | Inoue et al. | 503/204 |
| 5,258,353 | 11/1993 | MacDonald et al. | 503/227 |
| 5,260,254 | 11/1993 | Hotta et al. | 503/217 |

OTHER PUBLICATIONS

English Translation of Japanese Application 3-092934, Mar. 29, 1991.

English Translation of Japanese Application 3-092933, Mar. 29, 1991.

English Translation of Japanese Application 3-128439, Apr. 30, 1991.

English Translation of Japanese Kokai Patent, HEI 4-329,993, Nov. 18, 1992.

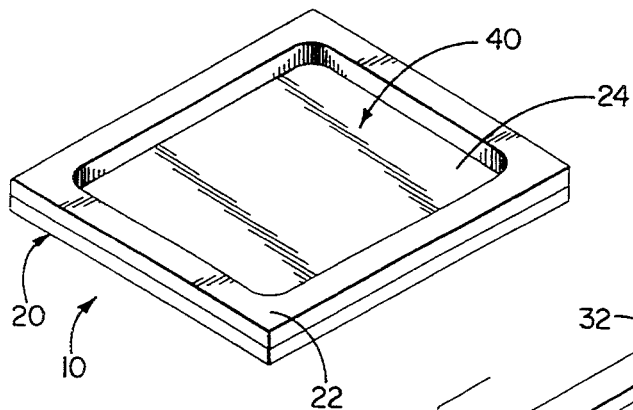
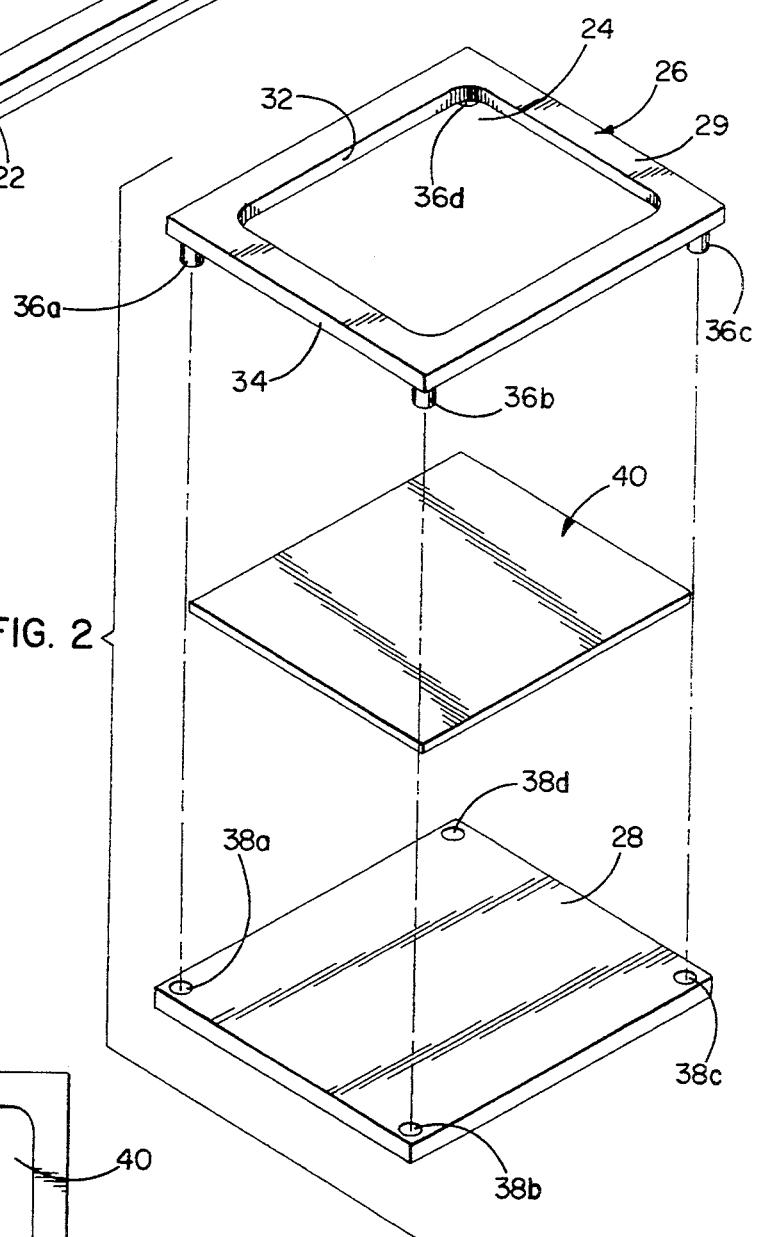
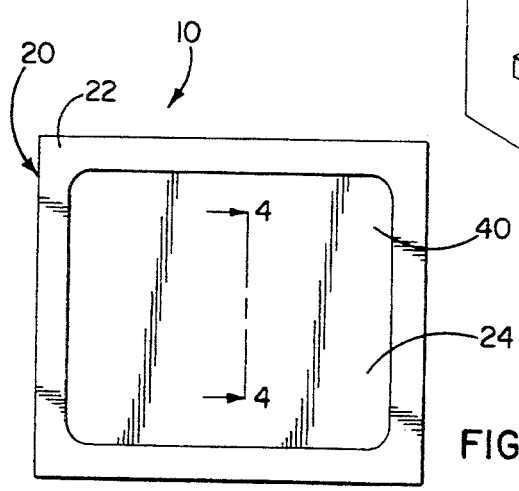

THERMOCHROMIC DRAWING DEVICE

FIELD OF INVENTION

The invention relates to drawing surfaces and more particularly to erasable drawing surfaces which can be marked and erased without transferring ink or other materials to or from the surface.

BACKGROUND OF THE INVENTION

It is well known that reusable drawing surfaces which can be easily marked and erased are desirable in many applications. A basic and well known example of such a device is the common school room chalk board. The chalk board is a generally black surface made of graphite, slate or some other material which can be marked with chalk. When the user desires to change the markings on the board he/she need only wipe the surface with a cloth, sponge or other soft material to remove previously existing chalk particles. The surface can then be remarked as desired.

In recent years there have been advances in the drawing surface art. For instance, new plastic surfaces such as white boards have been developed which can be marked, erased and re-used in a manner similar to the more traditional chalk board. These new surfaces, however, require the use of special writing utensils such as markers whose inks can be temporarily marked onto the plastic surface and removed with a cloth or soft material whenever the user desires.

It will be appreciated by those skilled in the art that both of these types of drawing surfaces have many undesirable properties. For instance, the chalk board is marked by scratching chalk dust onto the surface of the graphite board. This process creates dust which is generally distributed both into the atmosphere and onto the user's hands during the drawing process. Further, the erasing process basically entails smearing the chalk dust over the surface to enable heavier, more concentrated chalk marks to be made over the smeared dust. Not only does this tend to soil the user, but it makes further markings less distinct as they are made against a background of similarly colored, smeared chalk dust rather than the black color of a clean chalk board. Although the problem of partial erasure can be corrected by wiping the chalk board with a wet cloth, the chalk board is not readily marked when wet. Thus, total cleaning of the surface results in substantial down times between uses. Thus, it can be seen that both the drawing and erasing phase of chalk board use generates substantial quantities of undesirable dust that can soil a user and degrade the board's performance characteristics.

The plastic drawing surfaces or white boards that have been developed in recent times improve on the concept of chalk boards and overcome some of their weaknesses by providing a writing utensil with a less dusty transfer element. These transfer elements must still, however, be erased by smearing or transferring the markings onto another material such as a cloth. Thus, the user of these surfaces is still presented with the necessity of providing disposable or washable eraser material and the possibility of being soiled when using these boards. Further, the user is presented with similar performance degradation problems as a result of background smearing which are present in chalk boards although in a lesser degree.

OBJECTS OF THE INVENTION

It is therefore a general object of the present invention to provide a reusable drawing surface which can be marked without using ink, chalk or other transfer elements. Accordingly, it is an object of the invention to provide a reusable drawing surface which can be erased without transferring markings to an erasing material. It is a related object to provide a surface that can be used without soiling a user in either the drawing or erasing process. It is another object to provide a drawing surface which can be erased with a user's hand without transferring any material from the surface or soiling the user in any way. It is still another object of the present invention to provide a drawing surface whose markings remain similarly distinct from its background from use to use.

SUMMARY OF THE INVENTION

The present invention accomplishes these objectives by providing a thermochromic drawing device which changes colors in response to temperature changes. The thermochromic drawing device is provided with a drawing surface having a unique multi-layer structure which enables the device to quickly assimilate and sustain a temperature induced by a user. More specifically, the first layer of the drawing surface is a flexible substrate which is printed with a thermochromic ink or pattern of several different colored thermochromic inks. This flexible substrate is constructed to have low thermal mass. Consequently, the temperature of the substrate can be easily and quickly changed. Thus, if the user places an object on the substrate, the portion of the substrate adjacent to the object will quickly mirror the object's temperature. If the object is cool, the substrate will quickly become cool as well. Similarly, if an object is hot, the substrate will also become hot. In response to the temperature change induced by the object, the thermochromic ink or inks printed on the substrate will change color according to their known chemical properties.

In accordance with an important aspect of the invention, the thermochromic drawing device is provided with a second layer. This second layer is constructed of an insulating material which will not readily transmit heat to or from the flexible substrate. Further, the insulating layer isolates the flexible substrate preventing it from contacting any other surfaces. Ideally, the insulating layer is adhered to the bottom of the flexible substrate with adhesive material. Thus, only the upper surface of the flexible substrate is exposed to the atmosphere. As a result, the flexible substrate can only assimilate temperatures which are presented to its uppermost surface.

In accordance with another important aspect of the invention, the thermochromic inks printed upon the flexible substrate have a hysteresis characteristic. Thus, the inks will initially change to a first color state by being cooled to a temperature x, preferably some amount below the ambient room temperature. Then, to transition the inks to their second color state, the inks are heated to a temperature y, preferably some amount above the ambient temperature. In accordance with the hysteresis properties of the inks, the inks will not transition between colors until they are exposed to temperatures in excess of the x or y transition temperatures. Further, the x and y transition temperatures lie on opposite sides of the ambient temperature. For instance, if the ambient temperature is 73° F. (22.8° C.), x might be 50° F. (10° C.) and y might be 87° F. (30.5° C.) or vice versa. Thus, the inks have a "memory" and will retain their induced color state until exposed to a temperature beyond their transition temperatures.

Similarly, the inks can be designed to transition to a first color state when heated to a temperature y, preferably some amount above the ambient room temperature. Then, to transition the inks to their second color state, the inks are cooled to a temperature x, preferably some amount below the ambient temperature.

Since, as mentioned above, the flexible substrate has low thermal mass, it will quickly return to the ambient temperature after being pushed beyond a transition temperature x or y to induce a color change in the thermochromic inks. Thus, the memory characteristic of the inks is important. Since the transition temperatures are chosen to fall on opposite sides of the ambient temperature, the substrate's assimilation of the room temperature will not cause a change in the color of the drawing surface. Thus, the color states will not be changed by the temperature of the environment under ordinary circumstances.

In accordance with another aspect of the invention, one of the transition temperatures can be chosen so that the heat of the human body can cause a color change. Thus, a user can either erase or draw upon the surface with their hand.

Thus, it will be appreciated that no transfer elements are used to mark the drawing device. Rather, marks are created by changing the color state of inks contained within the surface. As a result, there is no possibility of soiling a user during use even if they use their hand for drawing or erasing. Thus, the present invention provides a reusable drawing surface which can be marked without transfer elements and which can be erased without transferring markings to an erasing material.

These and other features and advantages of the invention will be more readily apparent upon reading the following description of the preferred embodiment of the invention and upon reference to the accompanying drawings wherein:

BRIEF DESCRIPTION OF THE DRAWINGS

FIG. 1 is a left front perspective view of a drawing device constructed in accordance with the teachings of the invention;

FIG. 2 is an exploded view of the drawing device;

FIG. 3 is a top plan view of the drawing device illustrating the drawing surface in a white color state;

DESCRIPTION OF THE PREFERRED EMBODIMENT

Figure 4:
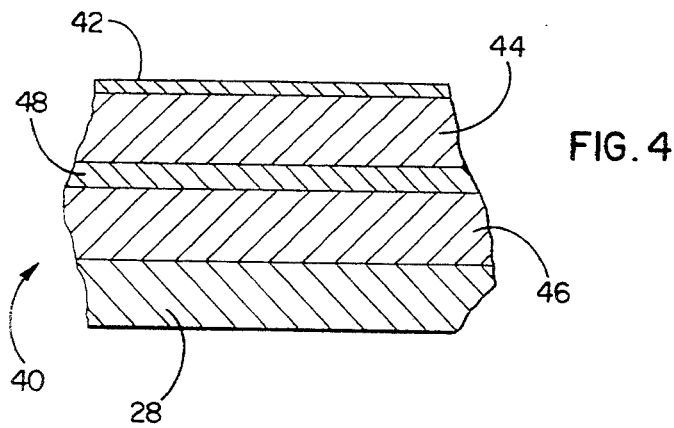
FIG. 4 is an enlarged, cross-sectional view of the drawing surface taken along lines 4—4 of FIG. 3.

A thermochromic drawing device 10 constructed in accordance with the teachings of the invention is illustrated in FIG. 1. The thermochromic drawing device 10 comprises a mounting frame 20 and a drawing surface 40. As best seen in FIG. 1, the frame 20 is preferably constructed to expose a portion of the drawing surface 40 for marking and erasing. It will be appreciated, however, that although the drawing device 10 is illustrated as being constructed with a small rectangular mounting frame 20, the size and shape shown here are for explanation purposes only. The device 10 can be constructed in virtually any shape or size which is conducive to a particular application. For example, the device 10 can be constructed as a large, wall mounted surface similar to a chalk board or as a larger surface suitable for table top use by many individuals simultaneously.

The preferred embodiment of the thermochromic drawing device 10 is provided with a mounting frame 20 which facilitates marking and erasing the drawing surface 40. The mounting frame 20 comprises a light weight, molded plastic rectangular box 22 with an open area 24 which permits access to the drawing surface 40. As best seen in FIG. 2, the mounting frame 20 comprises two interlocking pieces; an upper frame 26 and a support frame 28.

The upper frame 26 is designed to both facilitate marking the drawing surface 40 and to hold the surface 40 in a fixed position during use. To this end, the upper frame 26 is provided with an upper surface 29. The upper surface 29 has an open area 24 which exposes the drawing surface 40. The sides of the upper surface 29 are curved downward. For instance, the inner rim 32 of the upper surface 29 surrounds the open area 24 such that, when assembled, the inner rim 32 compresses the drawing surface 40 against the support frame 28 thereby retaining the drawing surface 40 in a fixed position. The outer rim 34 of the upper frame 26 also extends downward to abut the support frame 28 in the assembled position and gives the device a pleasing, sealed appearance.

In order to fixedly attach the upper frame 26 to the support frame 28, the upper frame 26 is provided with pegs 36a–d on the lower surface of its corners. Similarly, the support frame 28 which comprises a plastic sheet is provided with openings 38a–d for receiving the corresponding pegs 36a–d. The interaction of the pegs 36a–d of the upper frame 26 and the openings 38a–d of the support frame 28 serves to lock the two halves of the mounting frame 20 into a unitary structure.

As previously mentioned, the combination of the two frame halves 26, 28 holds the drawing surface 40 in a fixed position. However, it will be appreciated that other means of securing the drawing surface 40 to the support block 28 might also be appropriate. For example, an adhesive such as a pressure sensitive adhesive could be applied to the support frame 28 and the bottom of the drawing surface 40 to hold the surface 40 in place during use and assembly. Similarly, it will be appreciated that other frame constructions and configurations could also be employed.

As illustrated in FIG. 3, the thermochromic drawing device 10 provides a large drawing surface 40 for a user to mark. As best seen in FIG. 4, this drawing surface 40 has a multi-layered structure. The top layer 42 of this structure comprises a coating of thermochromic ink or inks which change color in response to temperature changes.

Thermochromic inks are commercially available products whose properties are known in the art. Therefore, it is unnecessary to provide a detailed description of their operation for our purposes here. It is sufficient to say that thermochromic inks come in several types. They can be chosen to change from one color to another color, such as red to yellow, or from colorless to a color, such as clear to red, and vice versa. Further, the inks can be chosen such that they exhibit hysteresis properties. For example, an ink might be provided which, while initially colorless, will turn red upon cooling to a temperature x. Then, to change the ink back to colorless the user would need to push its temperature to a level y, which is above the temperature x noted above. Any temperature less than y, such as the ambient temperature, will not change the ink's color. This hysteresis property is advantageous in the present invention because inks can be selected which do not change temperature in response to room temperature changes but only when subjected to temperatures intentionally in excess of the transition temperature. Furthermore, inks can be chosen which change color when heated to a level above the average room temperature of most buildings but below the average body temperature of a human, which is approximately 98.6° F. (37° C.) so that placing a human hand upon the surface will change the color of the ink. Thus, a user can use his or her hand to draw upon or erase the drawing surface 40.

Ambient temperatures in most buildings generally range between 69° F. (20.6° C.) and 75° F. (23.9° C.). Thus, if for example the ambient temperature in a given building is 73° F. (22.8° C.) and the lower transition temperature (x in the example given above) is 50° F. (10° C.) and the higher transition temperature (y) is 87° F. (30.5° C.), the normal ambient temperature fluctuations will not cause color transitions in the drawing surface 40 or impede the intentional heating or cooling of the surface 40 in any way.

As previously mentioned, thermochromic inks are commercially available products. At present, the thermochromic inks sold under the trademark "Chromicolor" by Matsui Shikiso Chemical Co., Ltd., a Japanese company with an office at 302 W. Grand Avenue, Suite 4, El Segundo, Calif. 90245 U.S.A. are preferred. Preferably the thermochromic inks sold under the label "History Type 2.5" are used.

Returning to FIG. 4, it can be seen that the thermochromic inks 42 are applied to a flexible substrate 44. This flexible substrate 44 is preferably a resilient material having low thermal mass. The resilience of the flexible substrate 44 enables the surface 40 to temporarily deform when subjected to the pressure of a stylus or hand. This deformation will actually cause the surface 40 to conform to the stylus or hand applying pressure and thereby prevents damage to the surface 40 such as scratching or puncturing which might result were the substrate 44 more rigid. The substrate 44 preferably has low thermal mass to enable it to quickly assimilate the temperatures a user wishes to induce in the surface 40 to cause color changes in the thermochromic inks 42.

Preferably the flexible substrate 44 comprises the commercially available product, Primax IML, Me. 00980, Treated One Side Polyolefin which is sold by Fasson, 230 Chester Street, Palmesville, Ohio 44077 U.S.A. This substance can be easily heated or cooled and its resilience makes scratching difficult. However, it will be appreciated by those skilled in the art that other resilient materials with low thermal mass might also be an appropriate choice for a substrate.

In accordance with an important aspect of the invention, the drawing surface 40 is further provided with an insulating layer 46. This insulating layer 46 is a very poor conductor of heat. Consequently, the temperature of the flexible substrate 44 will not easily be transferred to the insulating layer 46 during use. Thus, when a user wishes to heat the drawing surface 40 sufficiently to change the color of the thermochromic inks 42, the heat which the user applies to the drawing surface 40 will be absorbed by the substrate 44, not the insulating layer 46. In short, the insulating layer 46 insures there are no heat sinks which drain heat away from the substrate 44 and thereby impede or prevent the surface 40 from reaching a temperature sufficient to induce a color change in the inks 42. The insulating layer performs the opposite function when cooling the surface, i.e. prevents the transfer of heat through a cooling source to the substrate 44 which would impede cooling the inks 42 sufficiently to induce a color change. Thus, the insulating layer 46 comprises an important part of the invention. It isolates the substrate 44 from the environment thereby enabling the drawing device 10 to take advantage of the substrate's low thermal mass to facilitate color transitions in the thermochromic ink(s) 42.

Were the substrate 44 to be mounted to another surface without the benefit of the insulating layer 46, the color of the thermochromic inks 42 might never change. For example, if the substrate was merely mounted directly to frame 20, any heat applied to the substrate 44 would be drained into the frame. Thus, the substrate 44 might never achieve a temperature sufficient to transition the inks 42 from one color state to another. Similarly, in order to transition the ink's color states by cooling, a user would have to sufficiently cool the substrate 44 and the mounting frame 20 because an uninsulated substrate 44 would draw heat from the frame 20 thereby resisting the temperature change the user is attempting to achieve. As a result, the inclusion of the insulating layer 46 is an important part of the invention.

It should be noted that in the preferred embodiment, a closed cell foam comprises the insulating layer 46 although other insulating materials might likewise be appropriate. In the preferred embodiment, the closed cell foam is polyethylene foam which is commercially available under the trade name "Volara" from Packaging Solutions, Inc., 8853 Quivira Rd., Orland Park, Kans. 66214 U.S.A. As noted above, the insulating layer is preferably impinged between the two halves of the frame 20 and in effect floats above the support frame 28. However, it should also be noted that the insulating layer 46 could also be affixed to the support frame 28 by an adhesive (not shown).

The flexible substrate 44 is preferably affixed to the insulating layer 46 by an adhesive 48. Preferably, a pressure sensitive adhesive such as the commercially available Super Spray Adhesive Product No. 77 which is manufactured by 3M is used in this role although other adhesives might likewise be appropriate. 3M is located at the 3M Center Building in St. Paul, Minn., U.S.A.

Figure 5:
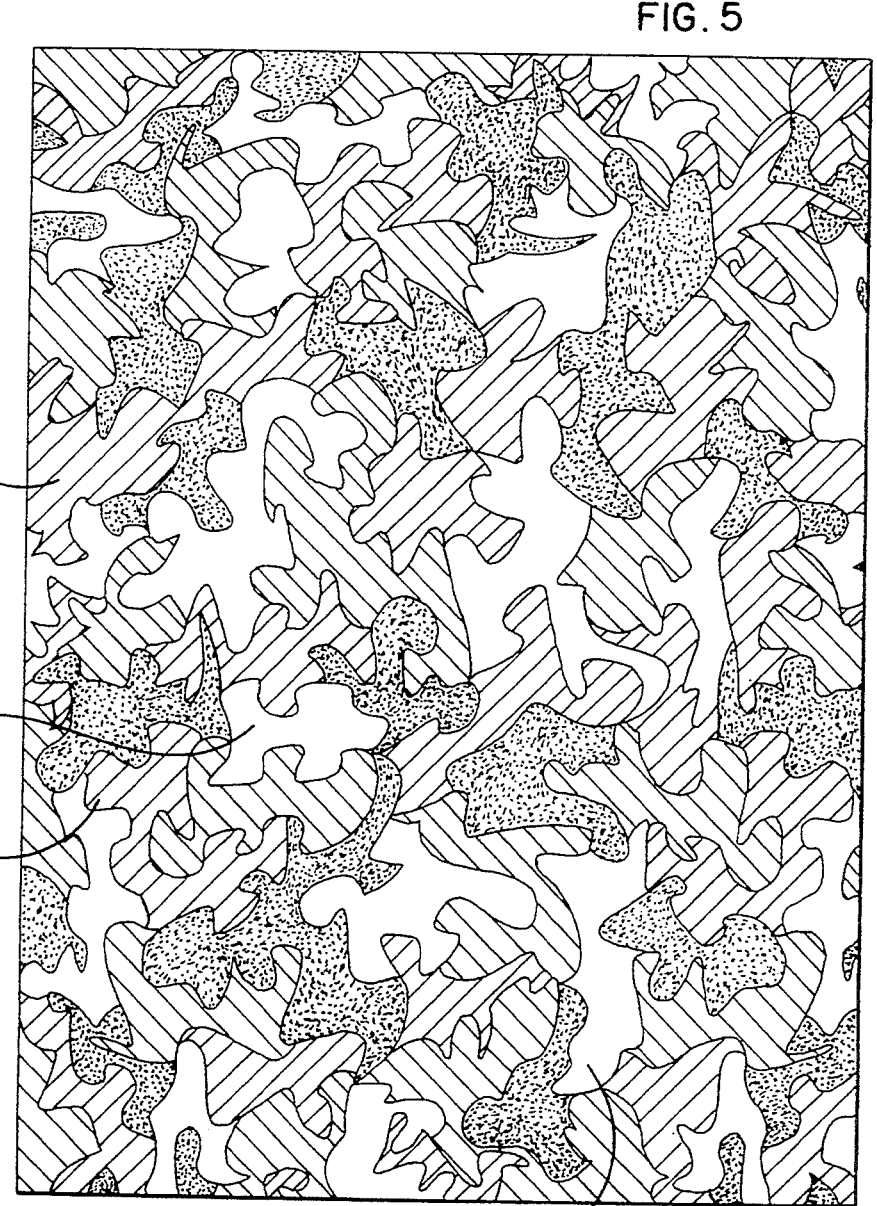
FIG. 5 is a top plan view of a pattern of thermochromic inks printed upon the flexible substrate of the drawing device.

In accordance with an important aspect of the invention, the flexible substrate 44 can be imprinted with multiple thermochromic inks 42. These inks 42 can be printed in distinctive sections such that their combination forms patterns such as those illustrated in FIGS. 5 and 6. For instance, the inks 42 can be incorporated into the substrate 44 in puzzle piece sections 43, 45, 47, 49 as shown in FIG. 5. Thus, when temperatures sufficient to transition the inks from one color state to another are applied to the surface 40, multiple color changes will occur.

Figure 6:
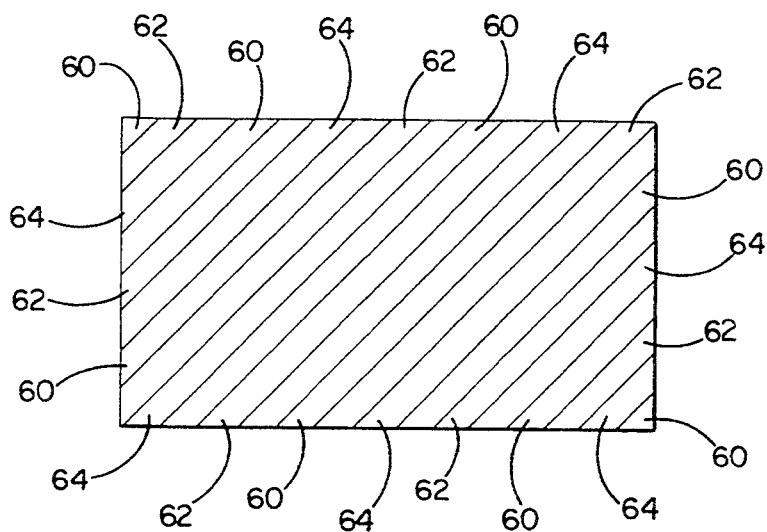
FIG. 6 is a view similar to FIG. 5 but illustrating an alternative thermochromic ink pattern.
Figure 7:
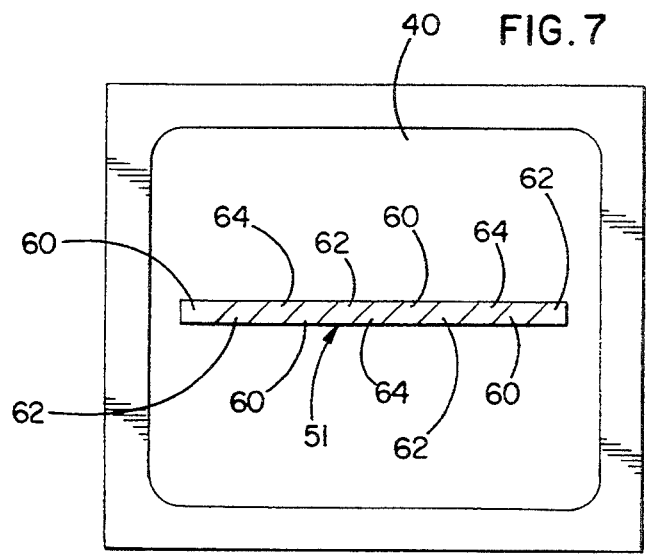
FIG. 7 is a top plan view of the invention shown in FIG. 6 illustrating a line drawn across the surface to reveal the thermochromic ink pattern.

For example, a thermochromic drawing device 10 can be constructed in accordance with the teachings of the invention such that in one state, the drawing surface 40 appears completely white as illustrated in FIG. 3 i.e. the thermochromic inks 42 applied to the drawing surface 40 all appear white when transitioned beyond a temperature of 87° F. (31° C.). The substrate 44 of this device 10 could be imprinted with a pattern comprising alternating stripes of thermochromic inks, such as the pattern illustrated in FIG. 6 which, while appearing clear in one state, achieve a distinctive color in their second state. In the illustrated device, these inks are red 60, green 62, and blue 64 in their second color states as best seen in FIG. 6. It should be noted that the numerals 60, 62, 64 are used to denote the alternating stripes of colored inks. As shown in FIG. 7, the discrete line 51 would then have sections of different colors 60, 62, 64. When the drawing surface's temperature is pushed beyond the inks' transition temperatures, the color states of the inks 42 will change. As best seen in FIG. 7, if the temperature of the surface 40 is selectively changed i.e. changed in sections with the tip of a finger, stylus, or writing instrument capable of generating temperatures in excess of the inks' transition levels, a discrete line 51 can be drawn upon the surface 40. As shown in FIG. 7, the line 51 would then have sections of different colors 60, 62, 64.

Figure 8:
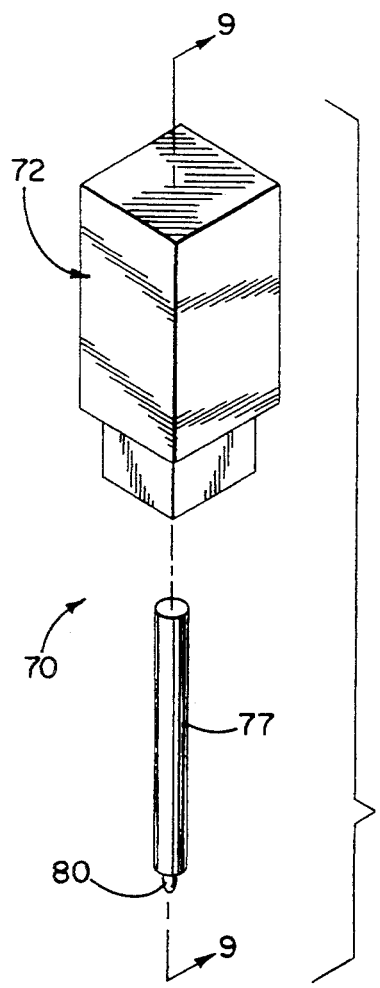
FIG. 8 is a right, front perspective view of a stylus for use with the drawing device.
Figure 9:
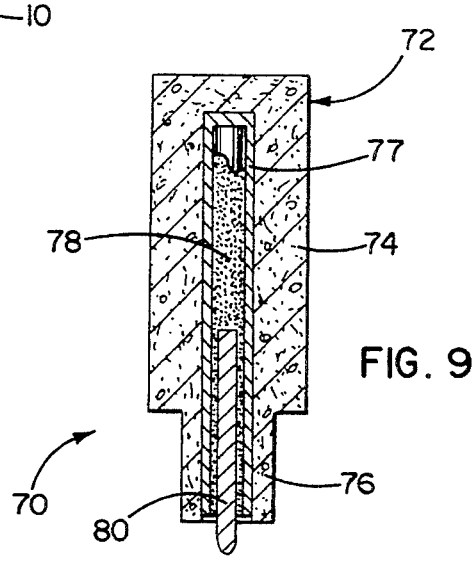
FIG. 9 is a cross-sectional view taken along line 9—9 of FIG. 8 illustrating the internal construction of the stylus.

As best seen in FIGS. 8 and 9, a stylus 70 is provided for discretely marking areas of the drawing surface 40. As best seen in FIG. 9, the stylus 70 has a foam body 72 comprising two integrally formed stages; a gripping portion 74 and a writing portion 76. The body 72 includes a central cavity 77 for containing a cooling substance 78. This cooling substance 78 can be anything from ice to a solution of chilled salt water contained in a plastic tube as long as it is sufficiently cold to change the color of the thermochromic inks 42. As best seen in FIG. 9, the stylus 70 is provided with a drawing tip 80 constructed of a material which readily conducts heat such as metal. This drawing tip 80 is inserted into the central cavity 77 such that one end abuts the cooling substance 78 and the other end extends beyond the end of the writing portion 76 of the foam body 72.

In use, the user grips the gripping portion 74 of the stylus 70 and draws the exposed end of the drawing tip 80 across the drawing surface 40 to transition the inks 42 to their second color state. A stylus 70 such as the one illustrated in FIGS. 8 and 9 has a small surface area tip and, consequently, is able to cool narrow strips of the surface 40 to create lines such as the one illustrated in FIG. 7.

It will be appreciated that since the inks in this embodiment are transitioned by exposure to the cool temperature of the ice, the second transition temperature of the inks can be chosen such that heat from the user's hand can transition the inks back to their first state. For example, if a user has drawn a discrete line 51 as illustrated in FIG. 7 by selectively cooling the colored area of the drawing surface 40 with a stylus 70 or other means, the user can place his hand or fingers upon the marked area to warm the surface 40 and change the inks 42 back to their colorless state. This color transition takes place because the user has supplied enough body heat to push the temperature of the substrate beyond the ink's transition temperature. Thus, it will be appreciated that the device 10 can be marked and erased without transferring any substance to its surface.

In summary, the present invention provides a thermochromic drawing device 10 capable of being marked without the use of transfer elements. Thus, a user is not at risk of becoming soiled in using the device 10. Further, the device 10 can be constructed such that a user can either erase or draw upon the surface 40 with his hands thereby obviating the need for either an erasing material or a drawing utensil.

We claim:

1. A thermochromic drawing surface for marking and erasing comprising:
   a flexible substrate having a drawing side and a bottom side wherein the flexible substrate has low thermal mass for quickly assimilating temperatures applied to the drawing side;
   at least one thermochromic ink applied to the flexible substrate having a first color state when the temperature induced in the flexible substrate falls below a first transition temperature and a second color state when the temperature of the flexible substrate exceeds a second transition temperature; and
   an insulating layer adjacent to the bottom side of the flexible substrate for preventing heat transfer to or from the bottom side of the flexible substrate thereby facilitating the flexible substrate's assimilation of the temperatures applied to the drawing side.

2. A drawing surface as defined in claim 1 wherein the insulating layer comprises a closed cell foam.

3. A drawing surface as defined in claim 1 wherein the first transition temperature of the thermochromic ink is below ambient temperature and the second transition temperature is above the ambient temperature of most homes or buildings.

4. A drawing surface as defined in claim 3 wherein the ambient temperature is between 69° F. (20.6° C.) and 75° F. (23.9° C.).

5. A drawing surface as defined in claim 3 wherein the second transition temperature is below 98.6° F. such that a human hand placed adjacent to the drawing surface can induce a transition in the thermochromic ink from the first color state to the second color state.

6. A drawing surface as defined in claim 1 wherein the flexible substrate is printed with multiple thermochromic inks.

7. A drawing surface as defined in claim 6 wherein the thermochromic inks are printed adjacent to one another.

8. A drawing surface as defined in claim 1 wherein the flexible substrate is fixedly attached to the insulating layer by an adhesive.

9. A drawing device for marking and erasing comprising:
   a drawing surface including a flexible substrate having low thermal mass and incorporating at least one thermochromic ink which can be selectively transitioned between at least two color states by selectively changing the thermochromic ink's temperature;
   a frame supporting the drawing surface; and an insulating material interposed between the flexible substrate and at least a portion of the frame for isolating the drawing surface from heat transfers to or from the environment.

10. A drawing device as defined in claim 9 wherein the insulating layer comprises a closed cell foam.

11. A drawing device as defined in claim 9 wherein the first transition temperature of the thermochromic ink is below ambient temperature and the second transition temperature is above the ambient temperature of most homes or buildings.

12. A drawing surface as defined in claim 11 wherein the thermochromic inks are printed adjacent to one another.

13. A drawing surface as defined in claim 11 wherein the second transition temperature is below 98.6° F. such that a human hand placed adjacent to the drawing surface can induce a transition in the thermochromic ink from the first color state to the second color state.

14. A drawing surface as defined in claim 9 wherein the flexible substrate is printed with multiple thermochromic inks.

15. A drawing surface as defined in claim 9 wherein the flexible substrate is fixedly attached to the insulating layer by an adhesive.

16. A drawing device for marking and erasing comprising:
a drawing surface including a flexible substrate having low thermal mass printed with at least one thermochromic ink which can be selectively transitioned between at least two color states by selectively changing the thermochromic ink's temperature;
a frame supporting the drawing surface;
an insulating material interposed between the flexible substrate and at least a portion of the frame for isolating the drawing surface from heat transfers to or from the environment; and
a stylus for selectively cooling the drawing surface sufficiently to transition the thermochromic ink to one of the color states.

17. A drawing device as defined in claim 16 wherein the stylus further comprises:
a gripping body having an internal chamber;
a cooling element disposed within the internal chamber; and
a writing tip having a first end disposed adjacent to the cooling element within the internal chamber of the gripping body and a second end extending beyond the gripping body wherein the writing tip is sufficiently cooled by its proximity to the cooling element to transition the thermochromic ink to one of the color states.

18. A drawing device as defined in claim 17 wherein the gripping body comprises a closed cell foam.

19. A drawing device as defined in claim 17 wherein the cooling element comprises ice.

20. A drawing device as defined in claim 17 wherein the cooling element comprises cooled salt water.

21. A drawing device as defined in claim 17 wherein the writing tip transfers heat from the drawing surface to the cooling element.

22. A thermochromic drawing surface for marking and erasing comprising:
a flexible substrate having a drawing side and a bottom side wherein the flexible substrate has low thermal mass for quickly assimilating temperatures applied to the drawing side;
at least one thermochromic ink incorporated in the flexible substrate having a first color state when the temperature induced in the flexible substrate falls below a first transition temperature and a second color state when the temperature of the flexible substrate exceeds a second transition temperature; and
an insulating layer adjacent to the bottom side of the flexible substrate for preventing heat transfer to or from the bottom side of the flexible substrate thereby facilitating the flexible substrate's assimilation of the temperatures applied to the drawing side.

23. A drawing surface as defined in claim 22 wherein the insulating layer comprises a closed cell foam.

24. A drawing surface as defined in claim 22 wherein the first transition temperature of the thermochromic ink is below ambient temperature and the second transition temperature is above the ambient temperature of most homes or buildings.

25. A drawing surface as defined in claim 24 wherein the ambient temperature is between 69° F. (20.6° C.) and 75° F. (23.9° C.).

26. A drawing surface as defined in claim 24 wherein the second transition temperature is below 98.6° F. such that a human hand placed adjacent to the drawing surface can induce a transition in the thermochromic ink from the first color state to the second color state.

27. A drawing surface as defined in claim 22 wherein the flexible substrate incorporates multiple thermochromic inks.

28. A drawing surface as defined in claim 27 wherein the thermochromic inks are printed adjacent to one another.

29. A drawing surface as defined in claim 22 wherein the flexible substrate is fixedly attached to the insulating layer by an adhesive.

* * * * *